United States Patent
Nylund

[11] Patent Number: 5,949,839
[45] Date of Patent: Sep. 7, 1999

[54] FUEL ASSEMBLY FOR A BOILING WATER REACTOR

[75] Inventor: Olov Nylund, Västerås, Sweden

[73] Assignee: Asea Brown Boveri AB, Vasteras, Sweden

[21] Appl. No.: 08/981,640

[22] PCT Filed: Jun. 4, 1996

[86] PCT No.: PCT/SE96/00736

§ 371 Date: Apr. 9, 1998

§ 102(e) Date: Apr. 9, 1998

[87] PCT Pub. No.: WO97/03447

PCT Pub. Date: Jan. 30, 1997

[30] Foreign Application Priority Data

Jul. 12, 1995 [SE] Sweden .................................. 9502574

[51] Int. Cl.⁶ .................................. G21C 3/17; G21C 3/32
[52] U.S. Cl. .......................... 376/438; 376/418; 376/444; 376/451
[58] Field of Search ..................................... 376/438, 434, 376/442, 440, 462, 370, 371, 451, 439, 412, 418, 444

[56] References Cited

U.S. PATENT DOCUMENTS

| | | | |
|---|---|---|---|
| 3,748,230 | 7/1973 | Gerosa et al. | 376/434 X |
| 4,914,679 | 4/1990 | Tomiyama et al. | 376/440 |
| 5,219,519 | 6/1993 | Matzner | 376/412 |
| 5,297,177 | 3/1994 | Inagaki et al. | 376/462 |
| 5,331,679 | 7/1994 | Hirukawa | 376/439 |
| 5,416,812 | 5/1995 | Matzner | 376/371 |
| 5,859,886 | 1/1999 | Nylund | 376/434 |

FOREIGN PATENT DOCUMENTS 63-315981  12/1988  Japan .

OTHER PUBLICATIONS

Kobayashi et al., Fuel Assembly, Patent Abstracts of Japan, JP 63–315981, vol. 13, No. 157, Apr. 1989.

Primary Examiner—Daniel D. Wasil
Assistant Examiner—Matthew J. Lattig
Attorney, Agent, or Firm—Pollock, Vande Sande & Amernick

[57] ABSTRACT

A fuel assembly for a boiling water reactor where the fuel assembly during operation is arranged vertically in the core of the reactor. The fuel assembly comprises a plurality of vertical fuel rods (22) arranged in one or more fuel bundles, wherein at least the majority of the fuel rods comprise a stack of fuel pellets (7) surrounded by a cladding tube (8b) and a plenum tube (23) which is connected to the upper part of the cladding tube (8b), the plenum tube having a cross-section area which is smaller than the cross-section area of the cladding tube. Further, the fuel assembly comprises a bottom tie plate (15) which retains and supports the lower part of the fuel bundle, a number of spacers (13) which retain and position the fuel rods in spaced relationship and are arranged axially separated along the fuel rods, a top spacer (21) which retains and supports the upper part of the fuel bundle and is arranged above and at a distance from the stacks of fuel pellets, and a fuel channel (2) which surrounds the fuel bundle or the fuel bundles.

9 Claims, 4 Drawing Sheets

A - A

FUEL ASSEMBLY FOR A BOILING WATER REACTOR

TECHNICAL FIELD

The present invention relates to a fuel assembly for a light-water nuclear reactor, and more specifically of boiling-water type.

BACKGROUND OF THE INVENTION

A core in a boiling water reactor comprises a plurality of vertically arranged fuel assemblies. A fuel assembly comprises a bundle of vertical elongated fuel rods which are retained and fixed by a number of spacers arranged in spaced relationship to each other along the bundle. The spacers comprise a number of cells for mutually fixing the fuel rods. The ends of the bundle are retained at the bottom and at the top, by a bottom tie plate and a top tie plate. In certain fuel assemblies, the bundle is divided into four orthogonal sub-bundles and the lower and upper parts, of each sub-bundle are retained by a bottom tie plate and a top tie plate, respectively. The bundle and the sub-bundles, are surrounded by a fuel channel which is normally designed with a square cross section. The fuel assembly comprises a vertical channel containing non-boiling water surrounded by a tubular casing. In the following, the channel including its casing will be referred to as a water channel. The water channel extends through the whole fuel assembly and has a cross section which may be circular or cruciform.

The fuel rods contain a stack of pellets of a nuclear fuel arranged in a cladding tube. During the burnup of the nuclear fuel, fission gases contained inside the fuel rod are released. To prevent the pressure on the cladding from becoming too great, an expansion space for the fission gases is needed, a so-called fission gas plenum. The fission gas plenum is normally arranged above the stack of fuel pellets.

The core is immersed into water which serves both as a coolant and as a neutron moderator. During operation, the water flows from below and upwardly through the fuel assembly, whereby part of the water is transformed into steam. The proportion of steam is highest in the upper part of the fuel assembly. In the following, coolant means the water and the steam which flow through the fuel assembly. When the coolant flows upwardly through the fuel assembly, it is important that it be subjected to as little pressure drop as possible. Because of the high proportion of steam, the pressure drop is higher in the upper part of the fuel assembly than in the lower part thereof. During operation, the pressure drop across a spacer in the upper part of the fuel assembly is about five times higher than the pressure drop across a corresponding spacer in the lower part of the fuel assembly. Therefore, it is of particular importance to design the upper part of the fuel assembly in such a way that there is as low a pressure drop as possible.

A low pressure drop in the upper part of the fuel assembly is favorable for the stability properties of the fuel assembly and reduces the risk of dryout.

A high pressure drop means a high pressure on the fuel channel and may give rise to creeping and subsequently unacceptable deformation of the fuel channel.

SUMMARY OF THE INVENTION

The object of the invention is to provide a fuel assembly which, during operation, has a low pressure drop in its upper part.

A fuel assembly for a boiling water reactor, wherein the fuel assembly during operation is arranged vertically in the core of the reactor. The fuel assembly comprises a plurality of vertical fuel rods arranged in at least one fuel bundle, wherein each one of the fuel rods comprises a stack of fuel pellets surrounded by a cladding tube. A bottom tie plate retains and supports the lower part of the fuel bundle and is arranged at the bottom of the fuel assembly. A number of spacers retain and position the fuel rods in spaced relationship to each other and are arranged axially separated along the fuel rods. A vertical water channel is provided through which water flows upwards through the fuel assembly, and a fuel channel which surrounds the fuel bundle. A top spacer which retains and supports the upper part of the fuel bundle and is arranged above and spaced apart from the stacks of fuel pellets, wherein the majority of the fuel rods are provided with a plenum tube which is connected to the upper part of the cladding tube and which surrounds a fission gas plenum, the plenum tube having a cross-section area which is smaller than the cross-section of the cladding tube.

BRIEF DESCRIPTION OF THE DRAWINGS

In the following, the invention will be described in greater detail with reference to the accompanying drawings, which, by way of example, show an advantageous embodiment of a fuel assembly according to the invention.

FIGS. 4a–4c show three different embodiments of a fuel rod for a fuel assembly according to the invention.

DETAILED DESCRIPTION OF THE PREFERRED EMBODIMENTS

Figure 1:
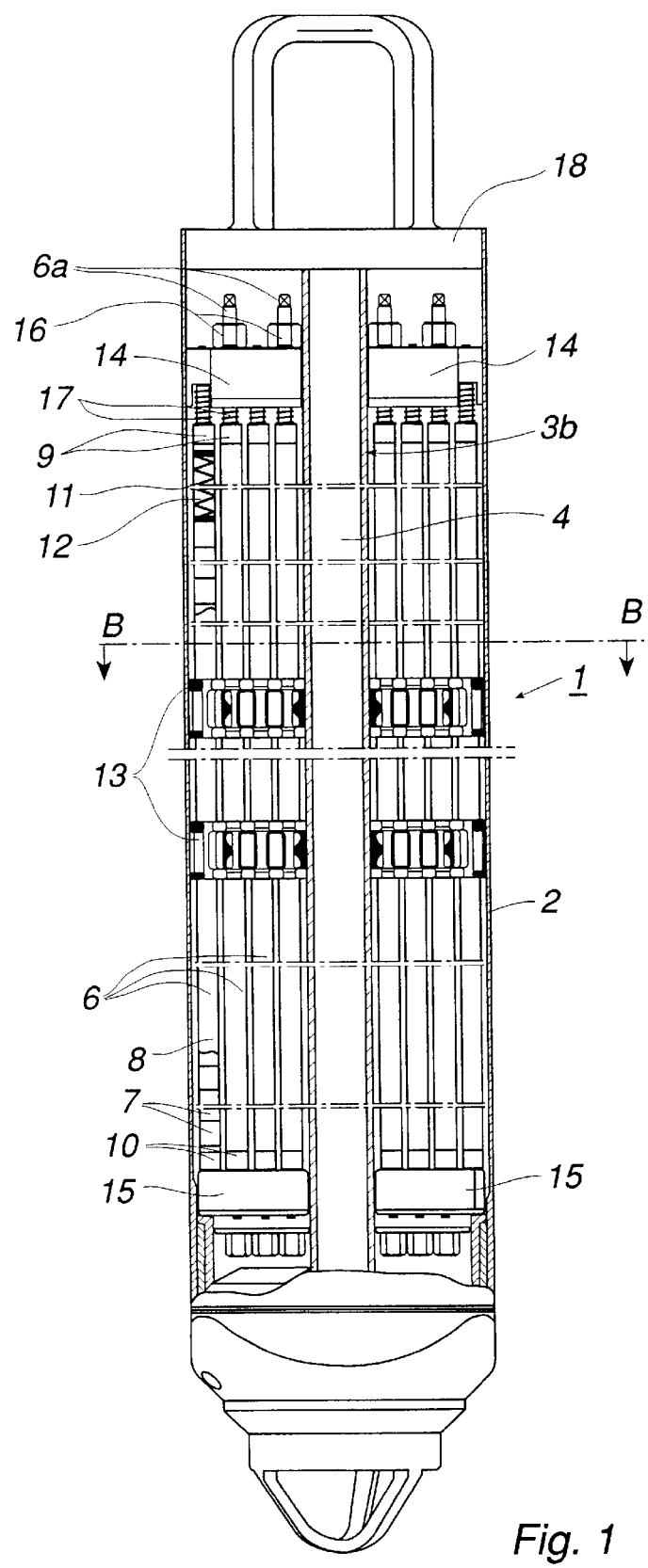
FIG. 1 shows a fuel assembly for a boiling water reactor according to the prior art in a section taken through the line A—A in FIG. 2.
Figure 2:
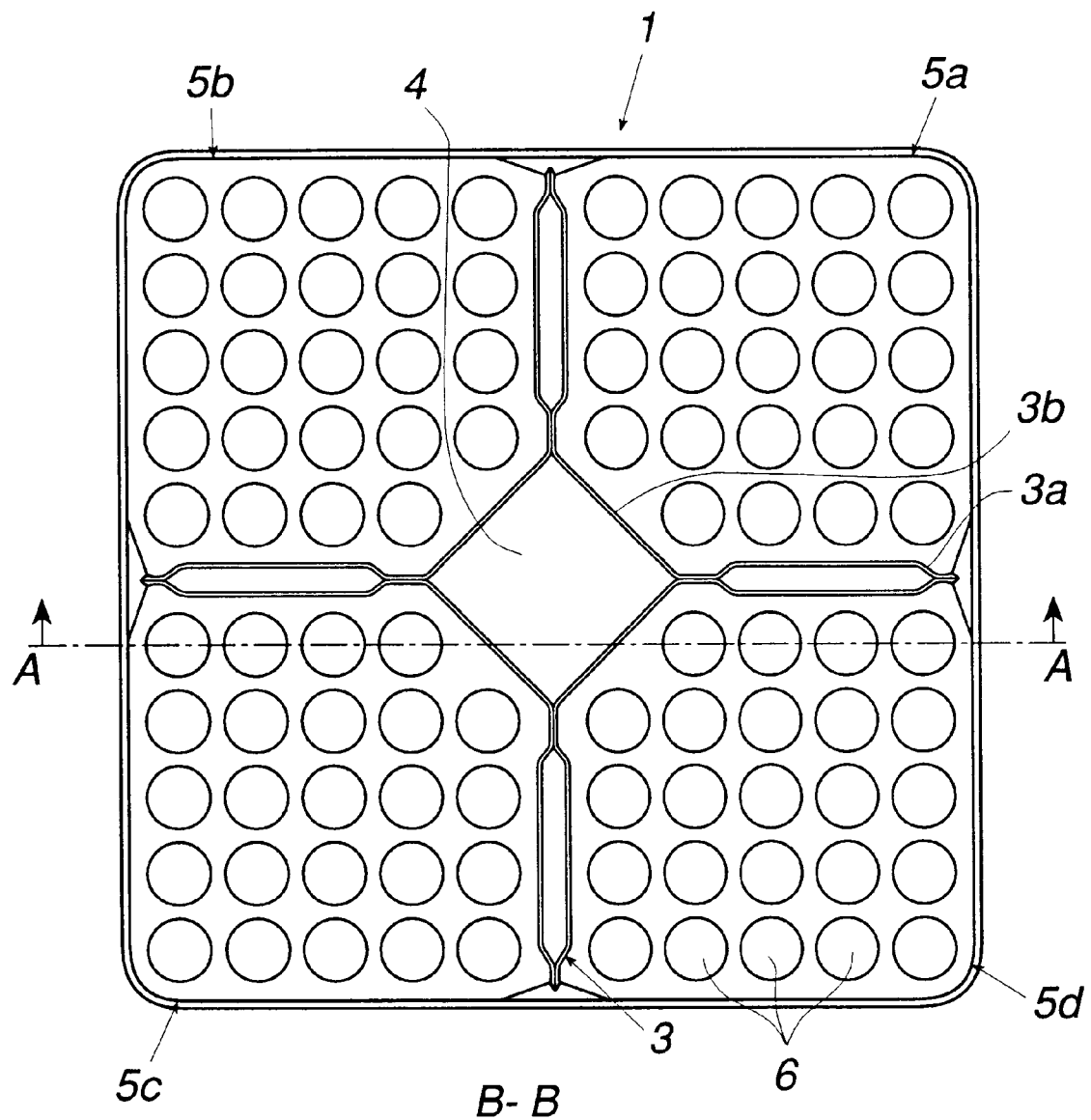
FIG. 2 shows the fuel assembly in FIG. 1 in a view perpendicular to a horizontal plane taken through the line B—B in FIG. 1.

FIG. 1 and 2 show a boiling-water fuel assembly 1 according to the prior art which comprises a long tubular container, with a rectangular cross section, referred to as a fuel channel 2. The fuel channel 2 is open at both ends so as to form a continuous flow passage, through which coolant flows. The fuel channel 2 is provided with a hollow support means 3 of cruciform cross section, which is secured to the four walls of the fuel channel. The support means comprises four hollow wings 3a and a hollow enlarged cruciform center 3b. The support means forms a vertical water channel 4 through which non-boiling water flows upwardly through the fuel assembly. The fuel channel with support means surround four vertical channel-formed parts 5a–5d, so-called sub-channels, with a substantially square cross section.

Each sub-channel contains a sub-bundle comprising a plurality of fuel rods 6 arranged in parallel, which contain fuel in the form of a number of cylindrical pellets 7 of uranium dioxide stacked on top of each other and enclosed in a cladding tube 8. The upper part of the fuel rod is sealed by a top plug 9 and its lower part by a bottom plug 10. The active part of the fuel assembly consists of that part which contains fuel and its height is determined by the height of the stacks of pellets. The fission gas plenum 11 is arranged between the stack of pellets and the top plug 9. The fission gas plenum should correspond to 5–10% of the volume of the fuel. For a fuel rod whose diameter is substantially constant and whose active length is 4 meters, this means that the fission gas plenum should be 0.2–0.4 meters. A helical spring 12 is arranged in the fission gas plenum and the task thereof is to absorb movements in the pellets as well as to press down the stack of pellets against the bottom plug.

The fuel rods 6 are kept spaced-apart by means of spacers 13 and are prevented from bending or vibrating when the reactor is in operation. The upper ends of the fuel rods are retained by a top tie plate 14 and their lower ends are retained by a bottom tie plate 15. Through two openings in the top tie plate 14, there extend two supporting fuel rods 6a which partially extend above the top tie plate. The two supporting fuel rods 6a are fixed to the bottom tie plate 15 and are each provided with a nut 16 at the upper side of the top tie plate 14. In this way, the top tie plate is prevented from being lifted out of its position by the water flowing through the fuel assembly. The other fuel rods in the sub-bundle are arranged resting on the bottom tie plate 15 and guided therein by pins on the bottom plugs 10 of the rods. The fuel rods make contact with the lower side of the top tie plate 14 by means of a helical spring 17 arranged around the respective top plugs 9 of the fuel rods. The helical springs 17 press the top tie plate 14 against the nuts 16, whereby these nuts limit the maximum distance between the top and bottom tie plates. The spaces between the fuel rods within each sub-channel are traversed by coolant. At the top of the fuel assembly, there is a top piece 18 provided with a handle in which the fuel assembly can be lifted.

Figure 3:
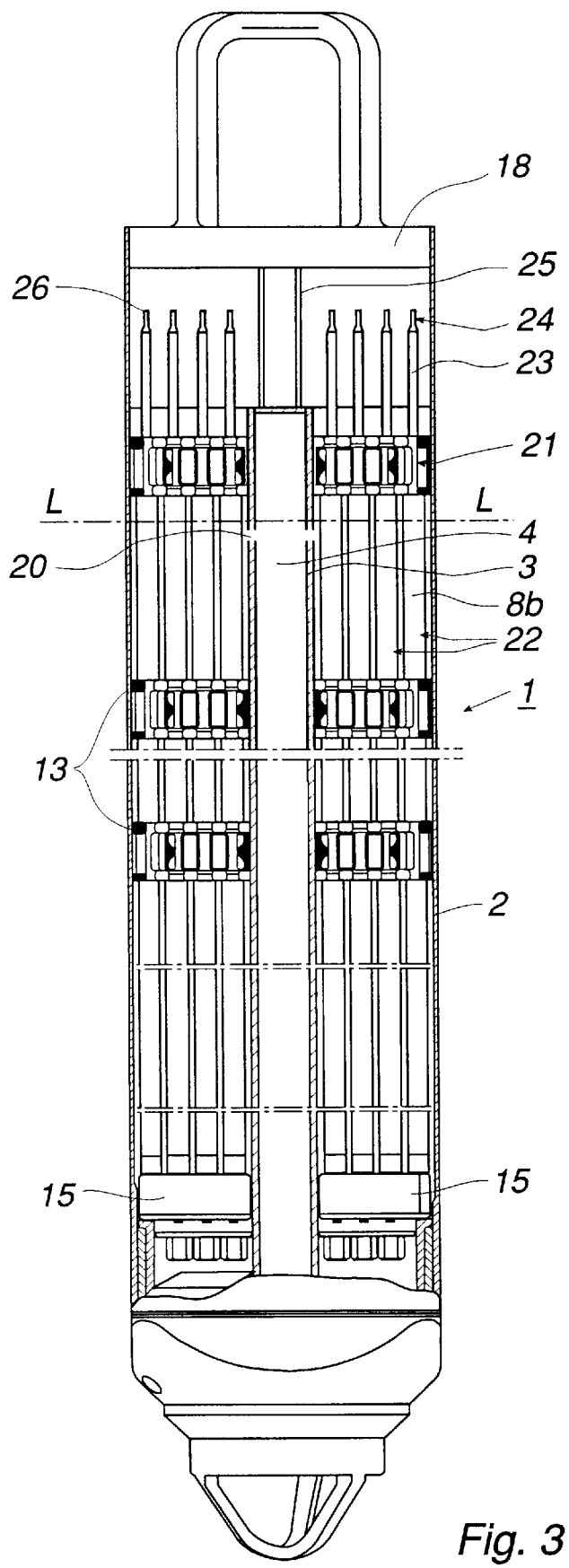
FIG. 3 schematically shows one embodiment of a fuel assembly according to the invention.

FIG. 3 shows a fuel assembly which, during operation, has a considerably lower pressure drop in its upper part as compared with the prior art. To avoid problems with turbulence, the reduction of the pressure drop occurs by allowing the coolant to expand successively in a number of steps. In a first step, the expansion takes place by part of the coolant, when reaching the end of the active part, flowing into the water channel 4 through a number of openings 20 and being conducted past the uppermost spacer 21. These openings 20 are arranged immediately below the level L—L where the active part ends. Above the level L—L there is thus no fuel. The openings 20 should not be arranged too far below this level since steam in the water channel deteriorates the moderation of the fuel.

In a second step, the coolant expands due to the fuel rods 22 changing to a smaller diameter. The transition takes places immediately above the active part. The upper narrower part comprises a fission gas plenum and will be referred to in the following as a plenum part. The plenum part comprises a plenum tube 23 and a top plug 24.

The upper part of the fuel rods are retained and supported by a top spacer 21 instead of by a top tie plate. The top spacer 21 is arranged immediately above the transition between the larger diameter of the cladding tube 8b and the smaller diameter of the plenum part. The plenum tubes 23 run freely through the top spacer 21 and extend about 10–20 cm above the top spacer. A spacer contains less material than a top tie plate and the top spacer which surrounds the plenum part can thus provide a smaller pressure drop than a top tie plate.

The top spacer 21 comprises cells, for mutually fixing the fuel rods, which have an inside diameter corresponding to the outside diameter of the plenum tubes 23. The other spacers 13 comprise cells which have an inside diameter corresponding to the outside diameter of the cladding tubes 8b. The top spacer rests partly against the fuel channel 2 and partly against the support means 3. The fuel rods 22 are prevented from moving upwardly past the top spacer 21 since this surrounds the plenum tubes 23 which have a smaller diameter than the cladding tube 8b. In each sub-bundle there are two so-called supporting fuel rods (not shown), which have the same thickness along their whole length. These are intended to lift the sub-bundle out of the fuel assembly. In their upper ends, the supporting fuel rods fix the top spacer and in their lower ends they are fixed to the bottom tie plate.

In a third step, expansion takes place due to the fact that the upper edge of the support means 3 terminates immediately above the top spacer 21 and somewhat below the upper part of the fuel rods. The support means as such causes a certain pressure drop. By terminating the support means further down in the fuel assembly, the pressure drop is reduced. Between the support means and the top piece, there is an interconnecting member 25 which distributes the lifting force so that the fuel channel 2 need not carry the whole lifting force when the fuel assembly is to be lifted. The connection between the fuel channel 2 and the top piece 18 may thus be given an advantageous design from the point of view of pressure drop.

In a fourth step, a smooth expansion takes place at the end of the fuel rods. The top plug 24 is designed so that the transition may be as smooth as possible. At the top plug, a further reduction of the diameter occurs. The top plug 24 comprises a cylindrical pin 26 which has a diameter which is smaller than the diameter of the plenum tube 23 and which is arranged above the plenum tube. The final expansion occurs when the coolant leaves the fuel assembly via the top piece 18.

Figure 4A:
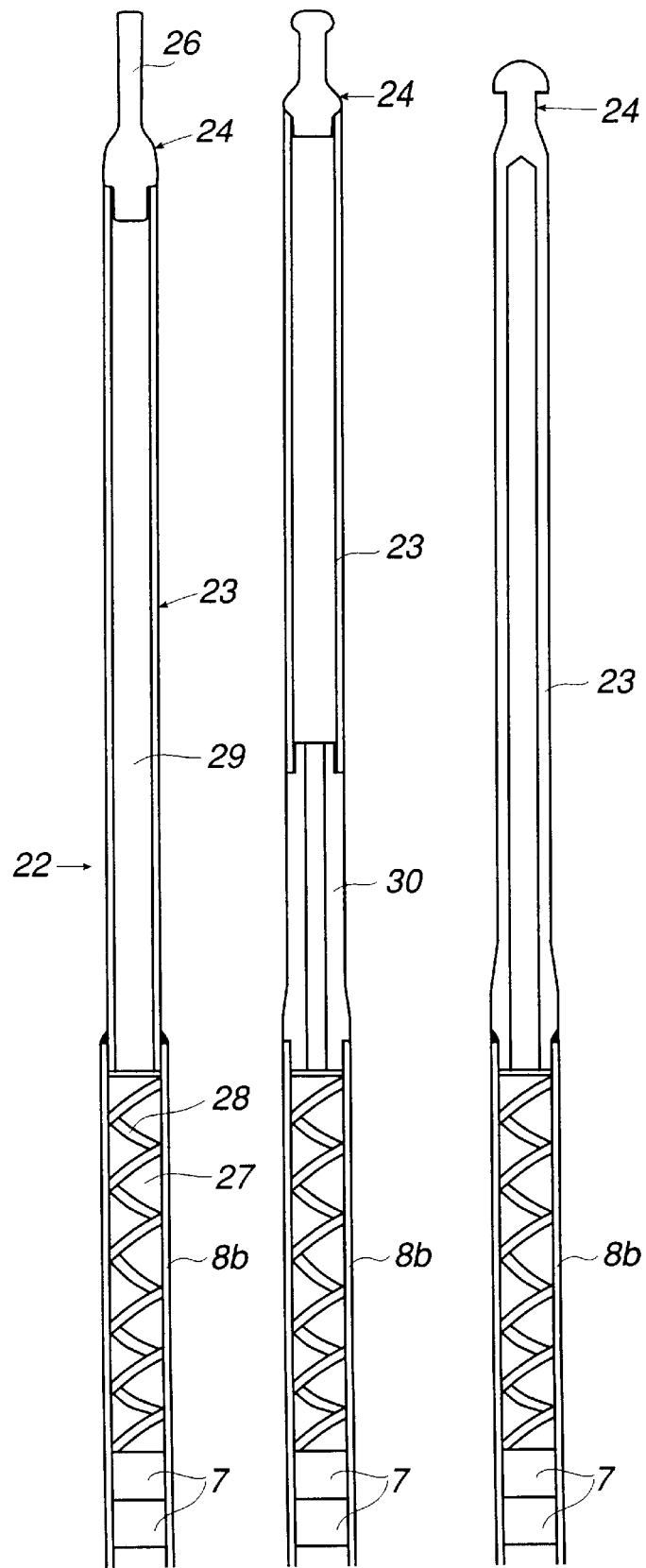

FIG. 4a shows in more detail the composition of a fuel rod 22 intended for a fuel assembly according to the invention. In its lower part the fuel rod comprises a stack of fuel pellets 7 surrounded by a cladding tube 8b. Above the pellets there is a space 27 in which the pellets are allowed to expand. The height of the space 27 is about 10 cm. In the space 27 there is a short helical spring 28 adapted for locking during transport of the fuel. The upper end of the helical spring rests against the transition to the plenum tube 23 and its lower end presses against the stack of pellets. Above, and partly inserted into, the cladding tube, the plenum tube 23 is arranged. In the example, the plenum tube 23 has an outside diameter corresponding to the inside diameter of the cladding tube 8b. The plenum tube is hollow and sealed by a top plug 24 at its upper end. The top plug extends somewhat above the plenum tube and comprises a cylindrical pin 26 with a diameter which is smaller than the diameter of the plenum tube 23. The pin is intended to be engaged by means of a chucking tool.

The plenum tube surrounds a space 29 which, together with the space 27, constitutes the fission gas plenum. The transition between the cladding tube and the plenum tube is open so that the fission gases which are formed in the fuel pellets may pass into the space 29. Since it is sufficient to use a short helical spring 28, the whole space 29 becomes available for fission gases. Only a small increase in length of the fuel rod is therefore needed to compensate for the smaller diameter.

FIG. 4b shows an embodiment of a fuel rod for a fuel assembly according to the invention which differs from the fuel rod in FIG. 4a by the provision of a hollow intermediate piece 30 between the cladding tube 8b and the plenum tube 23. In its upper part, the top plug 24 has the shape of a sphere to facilitate lifting the top plug. FIG. 4c shows an additional embodiment of a fuel rod for a fuel assembly according to the invention where the plenum tube 23 and the top plug 24 form an integral unit.

I claim:

1. A fuel assembly for a boiling water reactor, wherein the fuel assembly during operation is arranged vertically in the core of the reactor and the fuel assembly comprises:

a plurality of vertical fuel rods arranged in at least one fuel bundle, wherein each of the fuel rods comprises a stack of fuel pellets surrounded by a cladding tube, a bottom tie plate which retains and supports the lower part of the fuel bundle and is arranged at the bottom of the fuel assembly, a number of spacers which retain and position the fuel rods in spaced relationship to each other and are arranged axially separated along the fuel rods, a vertical water channel through which water flows upwardly through the fuel assembly, and a fuel channel which surrounds the fuel bundle, a top spacer which retains and supports the upper part of the fuel bundle and is arranged above and spaced apart from the stacks of fuel pellets, wherein the majority of the fuel rods are provided with a plenum tube which is connected to the upper part of the cladding tube and which surrounds a fission gas plenum, the plenum tube having a cross-section area which is smaller than the cross-section of the cladding tube.

2. A fuel assembly according to claim 1, wherein the plenum tubes run through the top spacer and extend somewhat above the top spacer.

3. A fuel assembly according to claim 2, wherein the plenum tubes extend at least 5 cm above the top spacer.

4. A fuel assembly according to claim 1, wherein the upper part comprises a top piece provided with a handle, and the water channel terminates below and at a distance from the top piece.

5. A fuel assembly according to claim 4, wherein the water channel terminates above the top spacer.

6. A fuel assembly according to claim 4, wherein between the water channel and the top piece, an interconnecting member is arranged.

7. A fuel assembly according to claim 1, wherein the water channel is provided with inflow openings in its upper part.

8. A fuel assembly according to claim 1, wherein the water channel has a cruciform cross section.

9. A fuel assembly according to claim 1, wherein in the upper part of the plenum tube, a top plug is arranged which comprises a cylindrical pin having a diameter which is smaller than the diameter of the plenum tube.

* * * * *